Dec. 22, 1931.    J. F. O'CONNOR    1,837,476
HAND BRAKE
Filed July 14, 1930

Witness
Wm Geiger

Inventor
John F. O'Connor
By Joseph Harris
His Atty.

Patented Dec. 22, 1931

1,837,476

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

HAND BRAKE

Application filed July 14, 1930. Serial No. 467,825.

This invention relates to improvements in hand brakes.

One object of the invention is to provide a power multiplying hand brake mechanism for railway cars, wherein the power multiplication is effected by combined power multiplying gear members and worm and worm wheel means.

A further object of the invention is to provide a hand brake mechanism of the character indicated in the preceding paragraph, wherein the power multiplying gear members are interposed between the chain winding drum and hand wheel operated worm and worm wheel means, whereby backward rotation of the chain winding drum is prevented, due to the friction existing between the worm and the worm wheel, and wherein the power multiplying gears are operatively connected to the worm wheel and worm by releasable clutch means, which when released permits free running of the chain winding drum and cooperating gears with respect to the worm wheel and worm, thereby preventing spinning of the hand wheel and protecting the brakeman from injury.

Other objects of the invention will more clearly appear from the description and claims hereinafter following.

Figure 1:
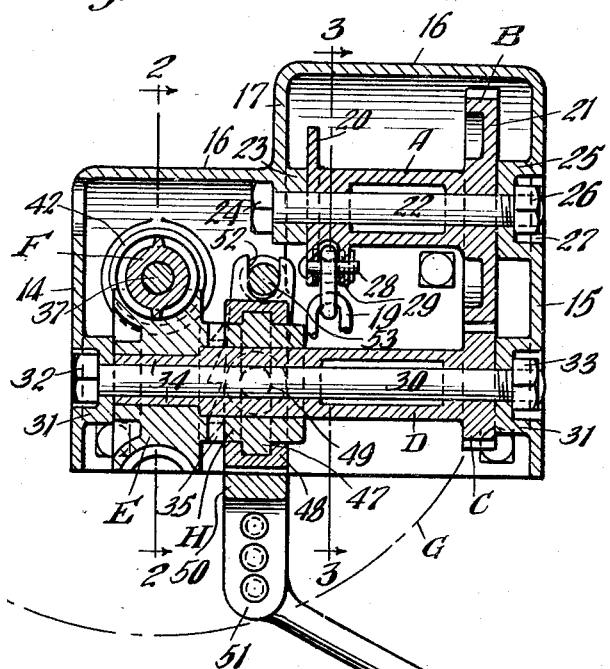
Figure 3:
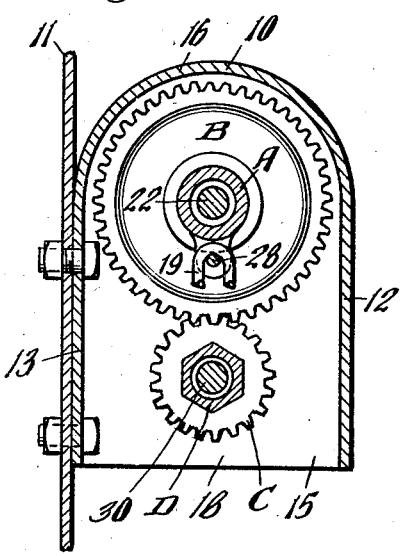
Figure 2:
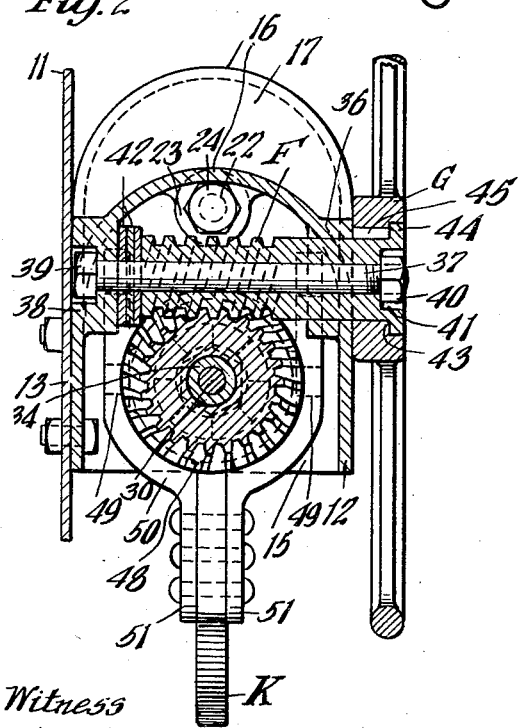
Figure 4:
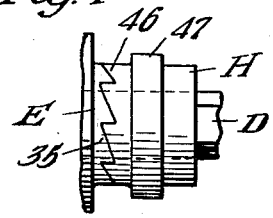

In the drawings, forming a part of this specification, Figure 1 is a vertical sectional view through my improved hand brake mechanism illustrating the same applied to the end wall of a railway car, the section being in a plane parallel to said end wall. Figures 2 and 3 are vertical transverse sectional views corresponding respectively to the lines 2—2 and 3—3 of Figure 1. And Figure 4 is a detailed elevational view of the improved clutch mechanism employed in connection with my hand brake.

In carrying out my invention, I enclose the operative parts of the hand brake mechanism within a housing 10, which is fixed to the vertical end wall 11 of the railway car. The housing comprises spaced vertical front and back walls 12 and 13, spaced side walls 14 and 15, and a top wall 16. The housing is of greater height at the righthand side, as viewed in Figure 1, to accommodate certain of the gear members which are employed to multiply the power and also accommodate the chain winding drum. The enlarged portion of the housing is provided with a vertical wall 17 at the left hand end thereof, as viewed in Figure 1, which connects the two sections of the top wall 16 of the housing. The bottom of the housing is open, as indicated at 18, to acommodate the brake chain 19, which is connected at one end to the chain winding drum and has the other end connected to the brake mechanism proper of the railway car, not shown.

My improved hand brake mechanism proper comprises a chain winding drum A; power multiplying gears B and C; a clutch shaft D; a worm wheel E; a worm F; an operating hand wheel G; a clutch sleeve H and a clutch shipper or operating lever K.

The chain winding drum A is in the form of a spool and has an annular flange 20 at the lefthand end thereof, as viewed in Figure 1. At the righthand end the drum A is formed with a relatively heavy annular flange 21 of greater diameter than the flange 20, which flange forms the gear member B of the power multiplying gearing. The chain winding drum is rotatably supported on a shaft 22 having the lefthand end thereof, as viewed in Figure 1, supported in a bearing projection 23 depending from the top wall 16 of the housing and forming an extension of the vertical wall section 17. The shaft 22 is headed at the corresponding end, as indicated at 24, the head 24 bearing on the projection 23 to prevent endwise movement of the shaft. The opposite end of the shaft is supported in an inwardly projecting boss 25 on the side wall 15 of the housing. The shaft is retained in assembled relation by means of a nut 26 accommodated in a pocket 27 formed in the boss 25. The chain 19, which leads to the brake mechanism proper, is secured to the drum A by means of a retaining pin 28 extending through the flange 20 and a lug 29 spaced from said flange.

The clutch shaft D is in the form of a sleeve and is rotatably supported on a shaft or rod 30 extending therethrough and having its opposite ends supported in the side walls 14 and 15 of the housing. As most clearly shown in Figure 1, the side walls 14 and 15 are provided with inwardly projecting hollow bosses 31—31 within which the ends of the rod or shaft 30 are supported, the lefthand end of the rod being headed, as indicated at 32, and said head being accommodated in a pocket within the boss 31 of the wall 14. The rod is retained in assembled relation with the housing by means of a nut 33 threaded on the rod and accommodated within a pocket of the boss 31 of the wall 15. At the righthand end, as viewed in Figure 1, the clutch shaft D has the gear member C formed integral therewith, the latter meshing with the gear B of the chain winding drum. The gear C is of smaller diameter than the gear B, thereby providing for power multiplication in the chain tightening operation of the brake mechanism. The major portion of the shaft D, immediately adjacent the gear C, is of hexagonal cross section, as clearly indicated in Figure 3, and the lefthand extremity of said shaft, as shown in Figure 1, is of cylindrical cross section, as indicated at 34, and forms a bearing support for the worm wheel E. The section 34 of the shaft D is preferably of a diameter smaller than the diagonals of the hexagonal section of said shaft.

The worm wheel E is rotatably supported on the section 34 of the shaft so as to have free movement thereon. At the righthand end the worm wheel E, as viewed in Figure 1, is provided with a projecting clutch section 35 formed with clutch teeth. The section 35 of the worm wheel engages over the extremity of the hexagonal section of the shaft D and has an opening receiving said end of a diameter at least as great as the diagonals of the hexagonal section of the shaft, so that the worm wheel may rotate freely with respect to the same.

The worm element F meshes with the worm wheel E and is rotatable about a horizontal axis transverse to the axis of rotation of the worm wheel. As most clearly illustrated in Figure 2, the worm F is journaled at the righthand end in a bearing member 36 provided in the outer wall 12 of the housing. The worm element is further supported for rotation about a rod or shaft 37 extending therethrough and having its inner end supported in an offset section 38 of the back wall 13 of the housing, the inner end of the rod 37 being headed, as indicated at 39, and said head being accommodated in a pocket provided at said supporting portion 38. At the outer end, the rod 37 is provided with a retaining nut 40, which is seated within a pocket 41 at the corresponding end of the worm element F. A plurality of spacing shims or washers 42—42 are preferably interposed between the section 38 of the rear wall 13 of the housing and the rear end of the worm F.

The hand wheel G is secured to the projecting outer end of the worm element F and has the hub section thereof provided with an opening receiving said end of the worm element. The outer portion of the opening in the hub of the hand wheel is enlarged, thereby providing an annular retaining shoulder 43 which cooperates with an annular retaining flange or rib 44 on the worm element. To fix the hand wheel to the worm element for rotation in unison therewith, a locking key 45 is preferably provided.

The clutch sleeve H is slidably mounted on the clutch shaft D and has an opening of hexagonal cross section therethrough which receives the shaft. At the lefthand end, as viewed in Figure 1, the clutch sleeve is provided with an annular set of clutch teeth 46 which cooperate with the clutch teeth 35 of the worm wheel E. Between its ends the sleeve is provided with an annular outstanding rib 47 over which a clutch collar 48 is engaged. The clutch collar is provided with diametrically opposed trunnions 49—49, which are journaled in a fork member 50 at the inner end of the clutch shifting lever K. The fork member 50 is formed of two sections, which have arms 51—51 embracing the inner end of the lever K and which are riveted thereto. At the upper ends, the arms of the fork section 50 are notched, as indicated at 52—52, said notched portions engaging over a transverse pivot member 53 fixed to the front and rear walls of the housing.

In assembling my improved hand brake mechanism, the chain winding drum is first placed within the housing and secured in position by the supporting shaft or rod 22. The worm F is next applied by inserting the same through the bearing 36 in the front wall of the housing, the hand wheel G having first been assembled with said worm. After the worm has been placed within the housing, the retaining rod or shaft 37 is entered through the opening in the rear wall of the housing within the worm F and is locked in position by the nut 40. The clutch shaft with the clutch sleeve and worm wheel mounted thereon and the clutch operating lever attached is next placed within the housing and is secured by the supporting shaft or rod 30, which is entered through the opening in the wall 14 of the housing and inserted within the shaft D.

In a chain tightening operation, the hand wheel G is rotated in a clockwise direction, as viewed in Figure 1, thereby rotating the worm element F, which meshes with the worm wheel E. Rotation is thus imparted to the worm wheel E, and through the clutch member, which is at this time in operative engagement with the worm wheel, to the clutch shaft D. As the gear C is fixed to the clutch shaft, the same is rotated therewith and imparts rotation to the gear B with which it meshes, and to the chain winding drum A, thereby winding the chain thereon. During the chain winding operation, retrograde rotation of the drum is prevented due to the friction existing between the threads of the worm wheel and worm.

To quickly release the brakes, the lever K is pulled to the left, as viewed in Figure 1, thereby disengaging the teeth of the clutch sleeve H from the teeth of the worm wheel E and permitting relative rotation of the sleeve or shaft D and the worm wheel. The relative rotation of these parts permits free rotation of the chain winding drum and unwinding of the chain therefrom. As will be evident upon reference to Figure 1, the hand grip of the lever K is offset at one side, whereby the same is influenced to return to clutch engaging position through the action of gravity. When the brake mechanism reaches approximately its fully released condition, the clutch sleeve will automatically, through the action of gravity on the lever K, re-engage with the clutch element of the worm wheel E. In case the cooperating teeth of the clutch means do not exactly register when the chain has been completely unwound from the chain winding drum, a slight rotation of the hand wheel in chain winding direction will move the worm wheel E to a sufficient extent to effect such registration and proper re-engagement of the clutch teeth. As will be evident, the clutch sleeve may also be operatively engaged with the clutch teeth of the worm wheel E by manual operation of the lever K.

To back off or ease off the brakes, it is merely necessary to rotate the hand wheel G in a contra-clockwise direction, as viewed in Figure 1, while the clutch sleeve is in operative engagement with the clutch means of the worm wheel E.

From the preceding description taken in connection with the drawings, it will be evident that I have provided an exceedingly simple and efficient hand brake mechanism wherein the use of locking dogs or other means for preventing backward rotation of the chain winding drum is entirely dispensed with, the worm and worm wheel of my improved mechanism operating to effectively prevent such backward or retrograde rotation. Further, by providing the clutch means between the worm gearing and the power multiplying gearing, which cooperates with the chain winding drum, full and quick release of the brakes is assured without rotation of the hand wheel, thereby protecting the brakeman from injury. Further, by providing the worm and worm wheel in addition to the power multiplying gears which cooperate with the chain winding drum, the required power multiplication may be obtained without excessive difference in size of the power multiplying gear members, thereby reducing the size of the entire brake mechanism and adding to the compactness of the same.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a supporting housing having spaced side walls and a supporting bracket between said walls; of a chain winding drum; a shaft extending through said drum for rotatably supporting the same, said shaft having its opposite ends supported in one of said walls and said bracket respectively; a gear of relatively large diameter fixed to the drum; a gear of smaller diameter meshing with said first named gear; a rotary sleeve to which the gear of smaller diameter is fixed; a clutch member slidable on said sleeve and rotatable therewith; a second supporting shaft extending through said sleeve and having its opposite ends supported in the housing walls; a worm wheel rotatable on said sleeve, said worm wheel having clutch means thereon cooperating with said clutch member; means for shifting said clutch member, and rotatable worm meshing with said worm wheel; and manually operated means for rotating said worm.

2. In a hand brake mechanism, the combination with a supporting housing having spaced side walls; of a worm; of means for rotating said worm; a worm wheel meshing with said worm; a gear; a rotatable shaft to which said gear is fixed, said shaft extending through the worm wheel and rotatably supporting the same; a supporting member extending through said shaft from end to end thereof and having its opposite ends anchored in the housing walls; sliding clutch means on said shaft engageable with the worm wheel for operatively connecting the worm wheel and shaft; a rotatable chain winding drum having gear means thereon cooperating with said first named gear; and gravity influenced lever means for shifting said clutch means.

3. In a hand brake mechanism, the combination with a housing; of a chain winding drum supported within said housing for rotation about a horizontal axis; a gear of relatively large diameter fixed to said drum; a rotary shaft disposed parallel to said drum axis and rotatably supported within the housing; a gear of smaller diameter than said first named gear meshing therewith and fixed to said shaft; a worm wheel freely rotatable on said shaft; a clutch member reciprocable on said shaft and rotatable therewith; cooperating clutch means on said member and worm wheel; shipper means for reciprocating said clutch member to engage the same with the worm wheel to effect rotation of the chain winding drum, said clutch member being disengageable to permit free running of the chain winding drum to release the brakes; a worm member within the housing meshing with said worm wheel; and manually actuated rotary means for rotating said worm to effect rotation of the chain winding drum and tightening of the brakes.

In witness that I claim the foregoing I have hereunto subscribed my name this 10th day of July, 1930.

JOHN F. O'CONNOR.